United States Patent
Nejad-Sattari

(10) Patent No.: US 6,513,257 B2
(45) Date of Patent: Feb. 4, 2003

(54) METHOD AND APPARATUS FOR DETERMINING SCALE IN PHOTOGRAPHIC IMAGES

(76) Inventor: Reza Nejad-Sattari, 2 Old Brick Cir., Pittsford, NY (US) 14534

( * ) Notice: Subject to any disclaimer, the term of this patent is extended or adjusted under 35 U.S.C. 154(b) by 0 days.

(21) Appl. No.: 09/750,749

(22) Filed: Dec. 26, 2000

(65) Prior Publication Data
US 2002/0078581 A1 Jun. 27, 2002

(51) Int. Cl.[7] .............................. G01B 5/00; G06K 9/74
(52) U.S. Cl. ................... 33/563; 33/1 BB; 33/429; 33/474; 33/121; 33/122; 73/159; 382/111
(58) Field of Search ........................... 33/1 BB, 429, 33/430, 436, 474, 476, 483, 494, 121, 122, 501.01, 501.05, 562, 563, 566, 1 B, 679.1, DIG. 9; 73/159; 382/111, 141; 356/242.1, 238.1, 637, 401; 348/88, 92, 125

(56) References Cited

U.S. PATENT DOCUMENTS

| | | | |
|---|---|---|---|
| 1,708,551 A | * 4/1929 | Nell ............................ 33/476 |
| 1,831,536 A | 11/1931 | Luhn | |
| 2,475,490 A | 7/1949 | Gelardin | |
| 2,517,515 A | 8/1950 | Wehrenberg | |
| 2,701,980 A | * 2/1955 | Abbott .................... 356/238.1 |
| 2,817,266 A | 12/1957 | Gelardin | |
| 2,848,923 A | * 8/1958 | Diefenbach .................. 33/430 |
| 3,340,784 A | * 9/1967 | Zimberoff .................... 33/1 R |
| 4,557,599 A | 12/1985 | Zimring | |
| 4,583,181 A | * 4/1986 | Gerber et al. .......... 250/559.46 |
| 4,900,148 A | 2/1990 | Doerr | |
| 4,992,940 A | 2/1991 | Dworkin | |
| 5,040,228 A | * 8/1991 | Bose et al. .................. 348/349 |
| 5,125,034 A | * 6/1992 | Hudson et al. ............. 139/1 D |
| RE34,374 E | * 9/1993 | Davidson ............... 144/144.51 |
| 5,774,177 A | * 6/1998 | Lane .......................... 348/128 |
| 5,825,483 A | 10/1998 | Michael et al. | |
| 5,960,411 A | 9/1999 | Hartman et al. | |
| 5,963,915 A | 10/1999 | Kirsch | |
| 5,978,081 A | 11/1999 | Michael et al. | |
| 6,031,931 A | * 2/2000 | Chiu et al. .................. 382/141 |
| 6,219,930 B1 | * 4/2001 | Reid .......................... 33/1 BB |
| 2002/0052803 A1 | * 5/2002 | Amidhozour et al. ......... 705/27 |

FOREIGN PATENT DOCUMENTS

GB 2220743 A * 1/1990 ........... G01B/11/00

* cited by examiner

Primary Examiner—Diego Gutierrez
Assistant Examiner—Lydia M. DeJesus
(74) Attorney, Agent, or Firm—Stephen B. Salai, Esq.; Brian B. Shaw, Esq.; Harter, Secrest & Emery LLP

(57) ABSTRACT

An apparatus and method for determining scale in captured images is disclosed. The apparatus includes a rectangular and generally flat frame device for determining scale in captured image. The frame has measurement indicia located along the inside edges and alignment markers located along the outside edges. The preferred embodiment has one measurement scale on two sides of the frame with an origin located at the corner between them and a different scale on the remaining two sides with an origin located at the opposite interior angle of the frame. A method of using the frame in conjunction with a digital camera and a computer is also disclosed.

1 Claim, 5 Drawing Sheets

METHOD AND APPARATUS FOR DETERMINING SCALE IN PHOTOGRAPHIC IMAGES

FIELD OF THE INVENTION

This invention relates to a novel method and apparatus for determining scale in photographic images.

BACKGROUND OF THE INVENTION

The quality of a fabric, which can be used for items of clothing, upholstery, rugs, or carpets, is frequently associated with the closeness or fineness of a weave, or with the size of various features in the fabric such as tufts or knots. For example, conventional fabrics may be described in terms of the number of threads per inch, with a larger number usually designating a higher quality. The knot size and the density of knots present in the carpet can determine the relative quality of a carpet.

Accordingly, to evaluate fabric quality, it is desirable to be able to measure the fineness of weaves or other features. Various means of measurement have been employed, a common means being the use of a lens or magnifying glass, which is sometimes mounted on a support that includes a measuring scale. While such a method is useful with relatively light fabrics or swatches of fabric, it becomes impractical with heavier fabrics. It is particularly impractical, for example, when evaluating an oriental rug; not only is such a rug heavy, but also, no portion of the rug can be cut for sampling without destroying the rug.

There is a need, therefore, to provide a non-destructive, convenient means of measuring the fineness of a fabric such as an oriental rug.

SUMMARY OF THE INVENTION

The present invention allows a user to accurately judge the size of objects in a photograph. This invention was designed to facilitate both determining the knot size and calculating the knot density for a given section of carpet, thus determining the relative quality of the carpet. The main feature of the invention is a ruled frame, which is placed on a carpet. In a preferred configuration, the frame includes four sides, the interior edges of each side having indicia thereon corresponding to linear measurement scales. In this preferred embodiment, two diagonally opposite interior corners of the frame provide numerical origins for the scales. The frame can be sized to encompass the desired section of the carpet before it is photographed. Alternatively, the frame may be placed on the surface of the carpet, so that the resulting photograph gives the size of a particular feature, such as a knot, in the photograph.

The invention may also be used generally for determining the size of objects in photographs.

A preferred method of counting knots using the apparatus involves initially placing a section of carpet on a support surface. Then the ruled frame is placed over the carpet in view of the camera lens. The frame and the camera are configured so that the camera has a field of view that encompasses the frame. An image of the carpet and frame is then captured. This image may be transferred to a computer. When a user views an image captured by the camera, the indicia on the frame provide an instant reference against which the user can determine the size of features of the fabric without needing to know a relationship between the size of an object and the size of its image. The knot size is determined and the knots in the carpet are counted. The knot density can then be calculated. This process enables the viewer of the photograph to count the knots within a frame, without introducing scaling errors caused by enlargement or reduction.

DETAILED DESCRIPTION OF THE PREFERRED EMBODIMENT

Figure 1:
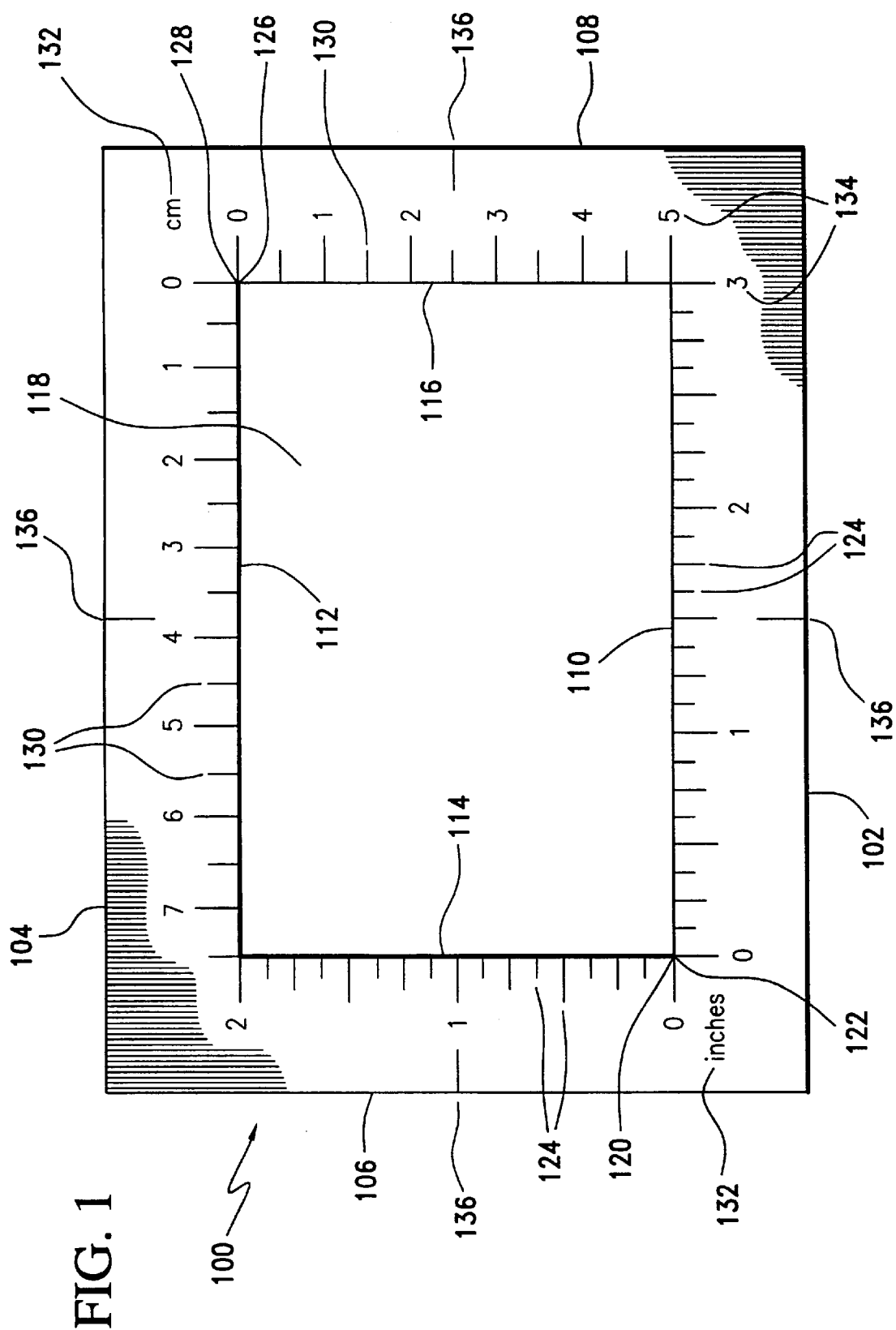
FIG. 1 illustrates a preferred embodiment of the present invention.

Referring now to FIG. 1, a preferred embodiment of the present invention includes a rectangular and generally flat frame 100, which can be made of a variety of materials including paper, wood, metal, or hard plastic. Depending upon what material constitutes the frame, the frame 100 may also be transparent.

Figure 2:
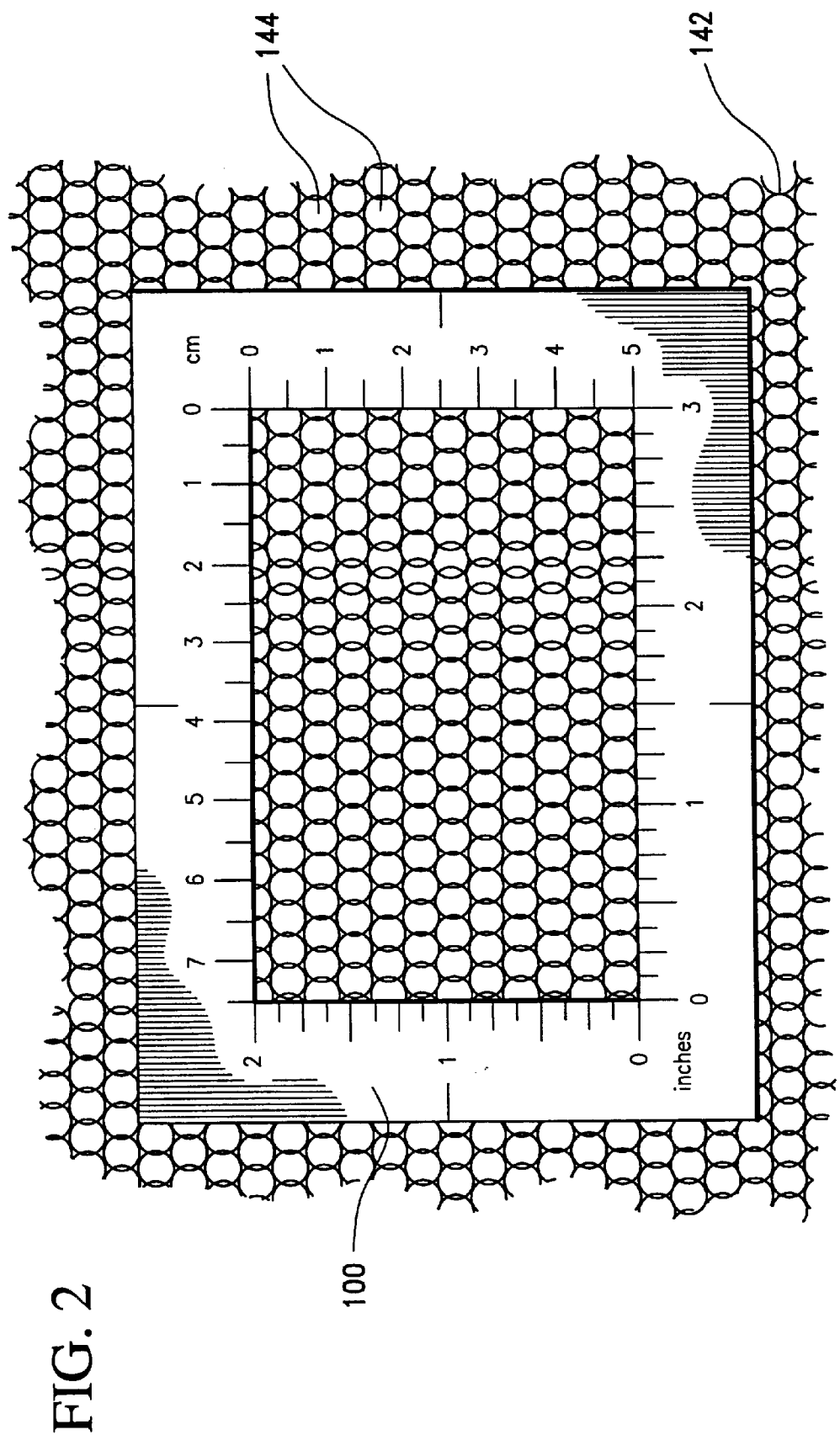
FIG. 2 illustrates an embodiment of the present invention placed upon a surface.

FIG. 2 shows the frame 100 atop a surface 140, which generally can be any surface. However, it is expected that typically the surface 140 will be a portion of material, which can be any fabric having a texture with measurable features. For our purposes the surface will be that of a carpet or rug 142 such as an oriental rug. It is possible to use the frame 100 when the features are randomly patterned, but most surfaces will have features that have a clear discernible alignment. The features of the fabric may, for example, be warp threads and weft threads, or may be tufts or knots 144 that have some general orientation, as shown in FIG. 2. In oriental rugs, the knots 144 typically range in density from 30 or 40 per square inch (about 5 per square centimeter) for a coarse rug to 900 per square inch (about 140 per square centimeter) for a fine rug.

The frame 100 has two longitudinal exterior edges 102 and 104, two lateral exterior edges 106 and 108, two longitudinal interior edges 110 and 112, and two lateral interior edges 114 and 116. The interior edges bound an opening 118. Located along each interior edge, 110, 112, 114, and 116, are uniformly spaced measurement indicia or distance markers. The measurement indicia may also be located along the exterior edges of the frames. In fact, if the frame is transparent, the measurement may be located in between the edges of each side of the frame.

In a preferred embodiment, distance markers 124 and distance markers 130 correspond to different units of measurement, one of which, for example, can include inches and subdivisions thereof, and the other of which, for example, can include centimeters and subdivisions thereof. The units of measurement are indicated by alphabetic indicia 132 and numerical indicia 134. Intersecting interior edges 110 and 114 meet at intersection 120, which provides a numerical origin 122 for distance markers 124 along each of the intersecting edges 110 and 114. Intersecting edges 112 and 116 meet at intersection 126, which provides a numerical origin 128 for distance markers 130 along each of the intersecting edges 112 and 116. It is also imagined that the origin 122 or 126 for each edge might be located at the center of each interior edge. This would be useful for calculating such quantities as the total area of a feature on a surface.

Each pair of opposed edges 102 and 104, and 106 and 108, may also have alignment markers 136. In the preferred embodiment, the alignment markers are located along the exterior edges of the frame. However, they could also be located along the interior edges. They could also be located alongside measurement indicia on an edge. The alignment markers on the frame may be aligned with reticle lines in the viewfinder of the camera. Cameras generally have a set of fixed lines called a reticle located in their viewfinders to allow a user to orient his or her camera with respect to the object to be recorded. By lining up the reticle lines with the alignment markers in the viewfinder, a user may create photographic images that are all oriented the same way. This enables faster and easier comparison of images. The markers are also used to align the frame 100 with features on a surface. In FIG. 2, it is evident that the frame 100 is longitudinally aligned with a principal orientation of the surface features such as the knots 144. If the camera, frame, and carpet are all aligned, it is easier and quicker for a user to determine the size and density of knots in a carpet.

Figure 5B:
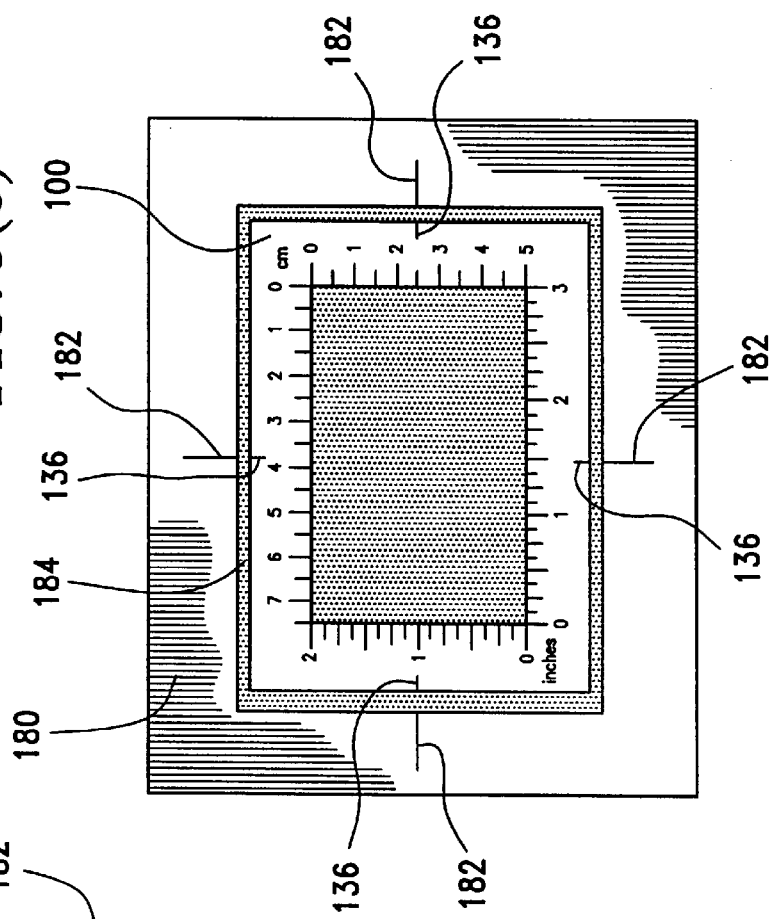
FIGS. 5(a) and 5(b) illustrate an embodiment of the present invention using an alignment piece.
Figure 5A:
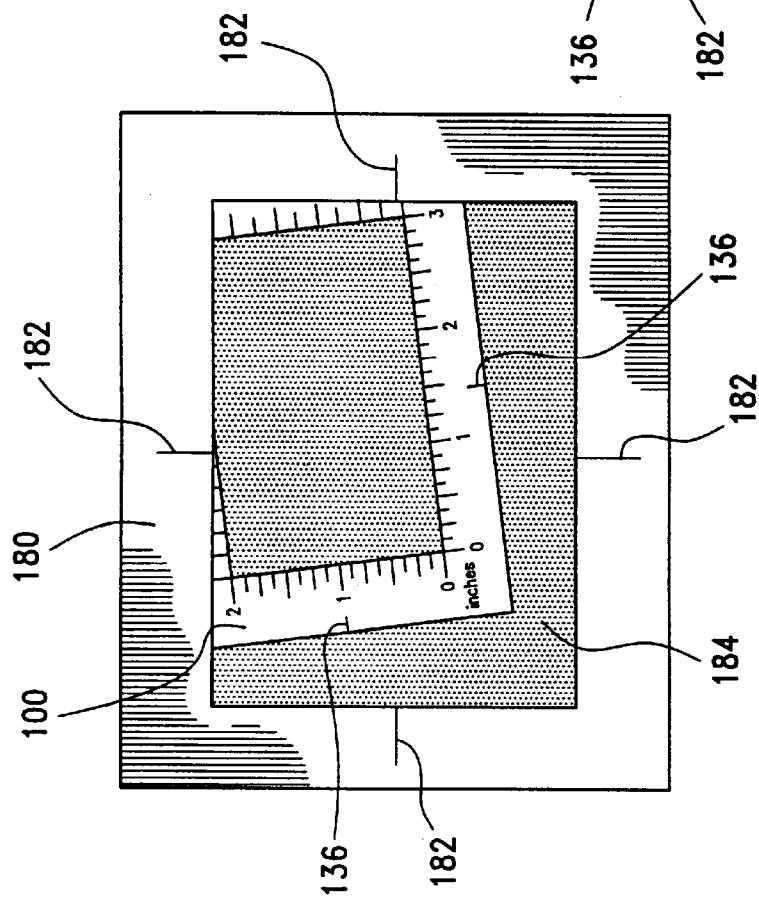

Some cameras do not have a reticle. If this is the case, an alignment piece 180, such as that shown in FIGS. 5a and 5b, may be placed flush with the camera between the rear side of the camera and the user. The user could then align the markers 136 on the frame 100 seen through the viewfinder 184 of the camera 160 with markers 182 on the alignment piece. The alignment piece 180 can be affixed to the camera to ensure that every picture taken will have the same orientation.

The center 118 of the frame 100 does not have to be an opening as described above. It may also comprise any thin transparent material. The only requirement is that the material should photograph well, i.e., it should not reflect the flash of a camera bulb or in any way obscure the carpet beneath the frame.

The frame itself does not have to be rectangular. It could conceivably be any geometric shape having at least one straight edge. It does not even require a set of parallel edges. It could have one straight interior edge and the entire exterior may be circular. In any case, the straight edge would have measurement indicia on it. This same edge may include an alignment marker.

As a specific example, the frame may take the form of an equilateral triangle. Each interior edge could then have a different measurement scale and each exterior edge would have an alignment marker arranged perpendicular to the exterior edge.

Figure 3:
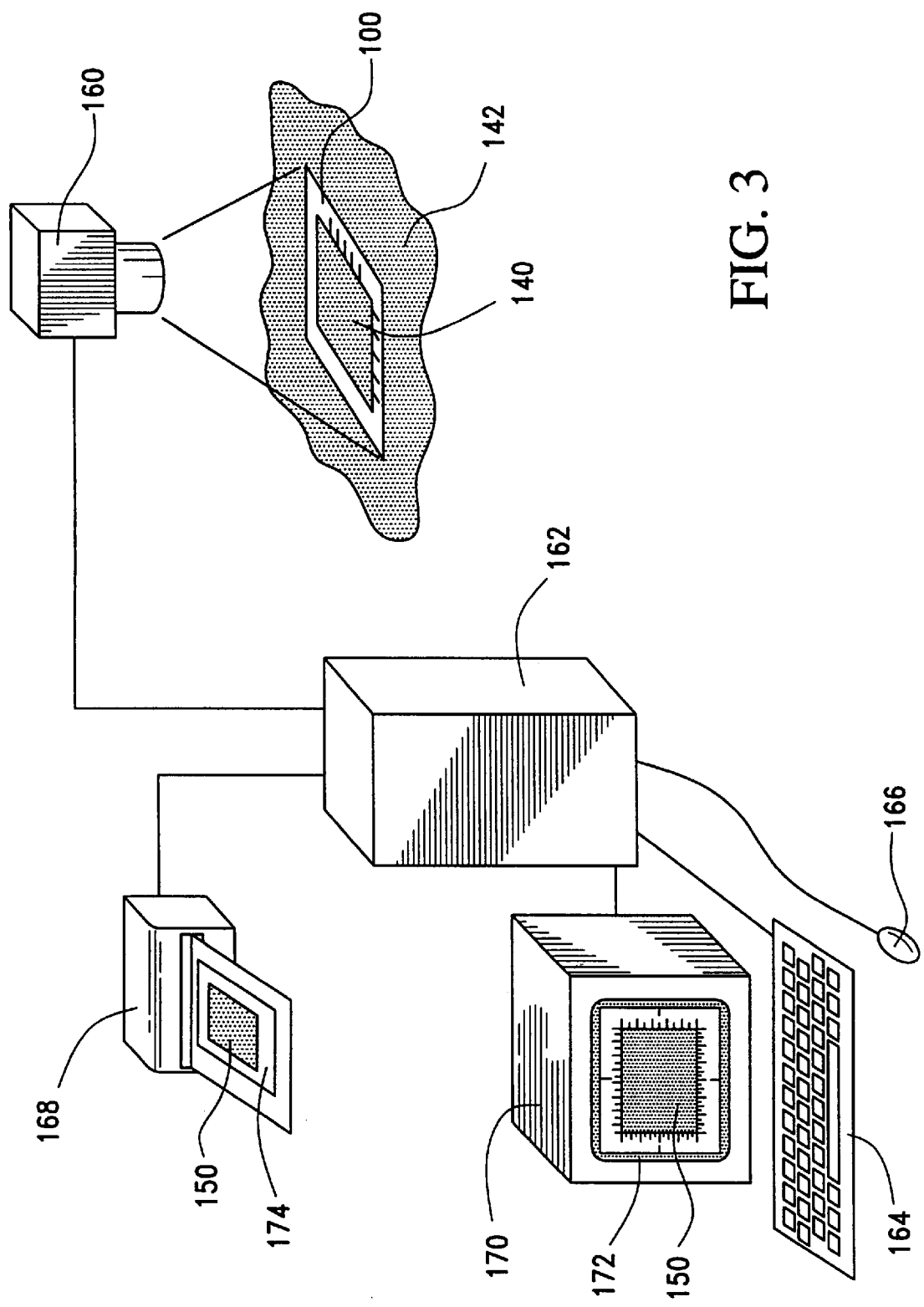
FIG. 3 illustrates a method of using the present invention in conjunction with a digital camera and a computer.

The frame 100 is normally used in conjunction with an imaging device such as a camera. While an example illustrated schematically in FIG. 3 shows an electronic camera 160, any form of camera could be used to capture an image 150, such as by using conventional or instant film. In the example of FIG. 3, the camera 160 is connected to a computer 162, which is in turn connected to a keyboard 164, a mouse 166, a printer 168 and a monitor 170 with a display 172. The image 150 can be viewed on the display 172 or on a hard copy 174 provided by the printer 168.

The electronic camera 160 may be a still camera or a movie (video) camera such as a camcorder. In the latter case, either the camera 160 or the computer 162 would have freeze-frame software, so that a user can store a selected portion of a varying image as a still image. The user may view the image and directly count the knots 144 thereon, along two perpendicular edges such as 102 and 106. Given that the opening 118 has a known area, a knot density can be determined, from which the average dimension of a single knot 144 is easily calculable.

The computer may be provided with software to count the knots 144 and calculate the knot density and average knot size, both of these characteristics being closely related to the quality of a carpet. This is also useful where there is a variation in knot sizes, in which case the software may also be configured to provide other data relative to size distributions, such a variance and range of knot sizes.

The camera may optionally be mounted on a swiveling boom or other device (not shown) so that it can readily be moved in three dimensions.

Typically, the opening 118 of the frame 100 is 3" (75 mm) long by 2" (50 mm) wide, and the exterior of the frame is 5" (125 mm) long by 4" (100 mm) wide, although other dimensions may be selected. The thickness of the frame 100 is typically 0.06" (1.6 mm). It is desirable for the opening to have a large fraction of the total frame area so that the area that can be viewed within the opening is maximized. On the other hand, it is also desirable that the interior and exterior edges of the frame 100 be spaced far enough apart to provide sufficient space for easily discernible indicia and for the provision of alignment markers on the exterior edge of the frame 100.

In a second embodiment, the distance markers 124 and 130 are not spaced uniformly spaced but instead are graduated so that their spacings vary according to a known function. In this case, the spacing between a specific pair of measurement indicia may coincide or nearly coincide with the dimension of the feature being measured, thereby facilitating its measurement.

In a particular example, the frame 100 could be intended to evaluate different surfaces having non-elongate features. The distance markers could be spaced apart at distances graduated in a square root relationship. In other word, the spaces between consecutive distance markers would be proportional to 1, 1.41, 1.73, 2, 2.23, etc, (i.e., the square roots of 1, 2, 3, 4, 5 etc.). Each successive selected space would have corresponding numerical indicia 134 proportional to 1, 2, 3, 4, 5, etc, to provide a measure of the area of the features being measured. The actual magnitude of the space between successive indicia and the numerical indicia could be selected to correspond with the expected dimensions of the feature being examined, such as a knot.

Figure 4:
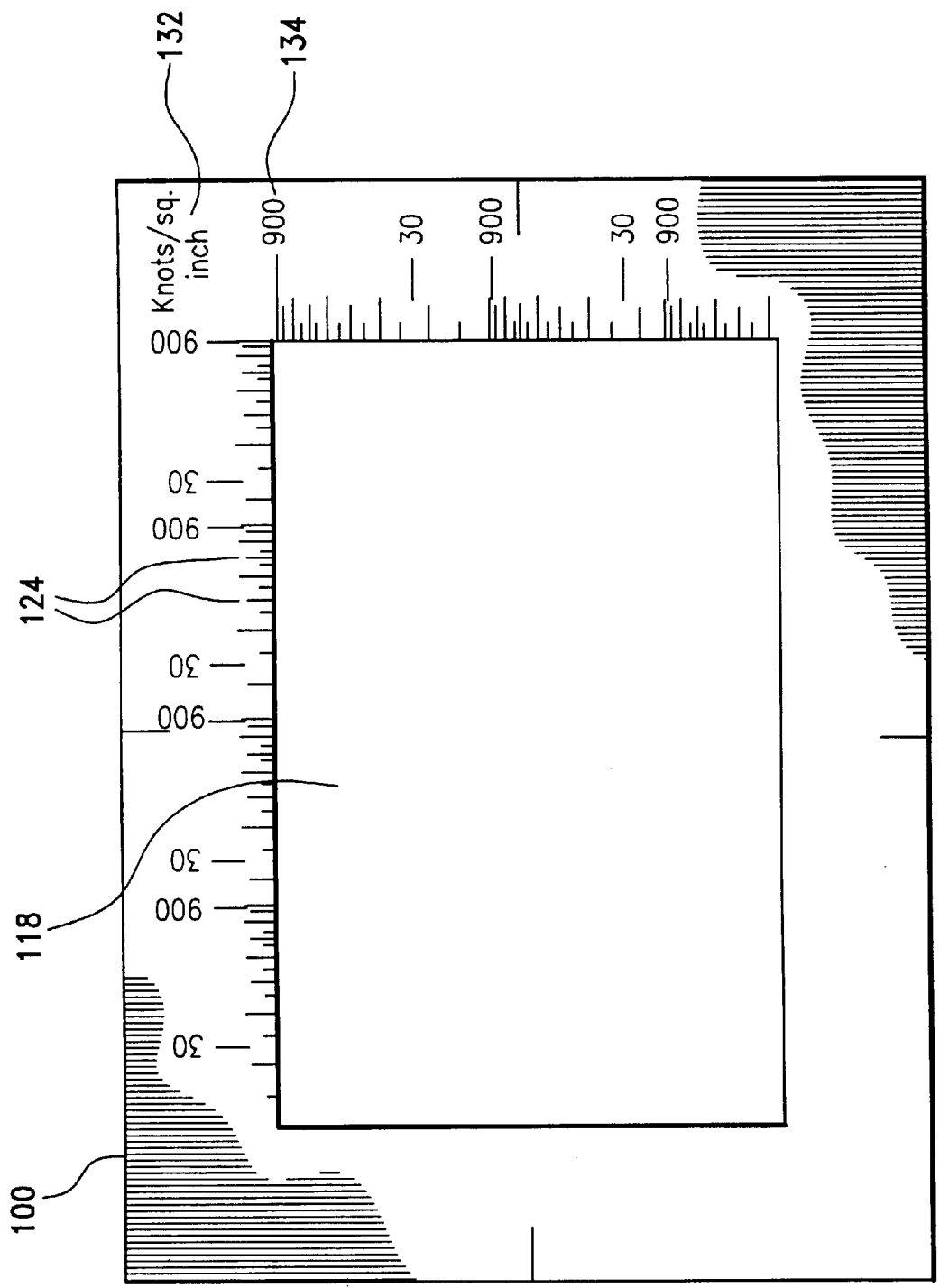
FIG. 4 illustrates a further embodiment of the present invention.

Alternatively, if it is anticipated that all the features in a given surface 140 will have essentially equal area, each successive space could be marked with indicia having an inverse relationship with the square root, which would provide the user with a direct measure of feature density. This is shown in FIG. 4. If the user desires that the inverse square-root indicia should be round numbers, the distance markers can be spaced accordingly. The distance markers and numerical indicia might enable the user to directly read the knot density in knots per square inch, although for clarity only some numerical indicia are shown in FIG. 4.

For these purposes, it might be more desirable to locate the origin for each side in the center of each interior edge as discussed above. Extending outward in each direction from the origin would be graduated markers that were spaced so that the distance between each marker and the origin would be half the distances listed above (0.5, 0.71, 0.87, 1, 1.12). The object could then be centered in the frame, and the size could then be determined.

The frame is used as follows, for example in evaluating an article such as an oriental rug when the frame 100 is placed thereon. Although it is possible for the user to inspect by eye the area of the rug 142 within the frame 100, it is often inconvenient to do so. For example, a large rug may be at the top of a pile of rugs and may not necessarily lie flat at accessible portions near its edges.

It is assumed that the system of FIG. 3 is used, and that the electronic camera 160 is a movie camera. The frame 100 is placed at a desired location on the rug 142, and the camera 160 is then positioned and focused above the frame 100. The image 150 of the frame 100 and the enclosed area of the rug 142 is sized so that it can occupy substantially the entire area of the display 172. If desired, the frame 100 can be repositioned with the aid of the image 150. If the knots 144 or other features have a discernible alignment, the frame 100 may optionally be placed in alignment with them by using either pair of alignment markers 136.

Once the desired image 150 is displayed, the user provides input via the keyboard 164 or the mouse 166 to freeze that image. The user can optionally view the image 150 and determine the size of a knot by comparing the size of a knot 144 with the space between either set of distance markers 124 or 130. Alternatively, the user may interface via the mouse 166 and the keyboard with the computer software to determine data pertaining to the average size, and size distribution of the knot 144.

It should be noted that the device is not limited to being used only with textile materials such as fabrics, carpets or rugs, but can be employed for evaluating any surface having discernible features sized comparably with the separation between selected distance markers. Although this invention was designed to better enable a person to determine the quality of a material in a photographic image, this frame may be used to add scale to any object in any captured image. Appearances of size in a variety of captured images will often be misleading, and this invention has been designed to aid the user visualizing the size of an object in the photograph.

While preferred embodiments of the invention have been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

I claim:

1. A method for determining the density of knots in a rug, using a rectangular frame of known dimensions, the frame having four interior edges each of which has a plurality of measurement indicia, the frame further having four exterior edges each of which has an alignment marker, the method comprising:

(a) placing the frame atop a selected portion of the rug;

(b) capturing with a camera an image of the frame and the area of the rug enclosed thereby;

(c) displaying the captured image on a computer;

(d) from the image, counting the number of knots along each of two perpendicular interior edges;

(e) using the counted numbers and the dimensions of the frame to determine a knot density.

\* \* \* \* \*